United States Patent
Fichter et al.

(10) Patent No.: US 6,484,073 B1
(45) Date of Patent: Nov. 19, 2002

(54) METHOD AND DEVICE FOR DETERMINING THE POSITION OF COMMUNICATION SATELLITES

(75) Inventors: Walter Fichter, Munich (DE); Jörg Flemmig, Friedrichshafen (DE); Günter Lange, Egmating (DE); Mihael Surauer, Chieming (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/807,679
(22) PCT Filed: Oct. 13, 1999
(86) PCT No.: PCT/DE99/03281
§ 371 (c)(1), (2), (4) Date: Jun. 14, 2001
(87) PCT Pub. No.: WO00/23817
PCT Pub. Date: Apr. 27, 2000

(30) Foreign Application Priority Data

Oct. 15, 1998 (DE) .......................... 198 47 480

(51) Int. Cl.$^7$ .............................. B64G 3/00; B64G 1/36; G06F 165/00
(52) U.S. Cl. .............................. 701/13; 701/4; 244/164; 348/147
(58) Field of Search .............................. 701/13, 4, 226, 701/220; 244/164, 165, 166, 168, 171, 176, 158 R; 348/147, 116, 117; 342/355, 357.14

(56) References Cited

U.S. PATENT DOCUMENTS

| | | | | |
|---|---|---|---|---|
| 4,617,634 A | * | 10/1986 | Izumida et al. | 364/455 |
| 5,109,346 A | | 4/1992 | Wertz | 364/459 |
| 5,452,869 A | * | 9/1995 | Basuthakur et al. | 244/164 |
| 5,546,309 A | * | 8/1996 | Johnson et al. | 364/434 |
| 5,738,309 A | * | 4/1998 | Fowell | 244/171 |
| 6,023,291 A | * | 2/2000 | Kamel et al | 348/147 |
| 6,038,499 A | * | 3/2000 | Kanda | 701/13 |
| 6,135,389 A | * | 10/2000 | Fowell | 244/158 R |
| 6,138,061 A | * | 10/2000 | McEnnan et al. | 701/13 |

FOREIGN PATENT DOCUMENTS

| | | |
|---|---|---|
| EP | 0482472 | 4/1992 |
| EP | 2690532 | 10/1993 |
| EP | 0843245 | 5/1998 |
| EP | 0847149 | 6/1998 |
| EP | 0880031 | 11/1998 |
| EP | 0910001 | 4/1999 |

OTHER PUBLICATIONS

Gleason D.M.: "Intersatellite Laser Ranging Experiment for Global . . . Control" Proceeding of the Int'l. Society for Optical Engineering, BD. 2374, 6.—8. Feb. 1995.

* cited by examiner

Primary Examiner—Tan Nguyen
Assistant Examiner—Dalena Tran
(74) Attorney, Agent, or Firm—Ladas & Parry

(57) ABSTRACT

Described is a device for determining the attitude on board of a satellite (1) with a data transfer device for carrying out optical data exchange between at least two satellites (1, 3); a device for determining one's own attitude; a device for determining the directional vectors in an inertial co-ordinate system from one's own attitude and from attitude data of at least two satellites (1, 3), said attitude data having been transmitted by means of the data transmission device; a device for determining the directional vector directed to the satellites (1, 3) of which there are at least two, in a fixed-body co-ordinate system of the satellite; and a device for attitude determination from the directional vectors determined. Also described is a method for carrying out attitude determination.

15 Claims, 2 Drawing Sheets

METHOD AND DEVICE FOR DETERMINING THE POSITION OF COMMUNICATION SATELLITES

BACKGROUND OF THE INVENTION

The invention relates to a device and a method for determining the position of one or several communications satellites.

Determining the attitude and control, i.e. the angular attitude, when operating present-day satellites, requires a precision in the magnitude of 1/100° for all three rotation axes. To meet these requirements, either star sensors or earth sensors which allow independent on-board operation, are available. Both measuring methods for determining the attitude of satellites are associated with the disadvantage that they require very considerable functional expenditure, in particular in relation to error detection. Star sensors which allow independent on-board operation are associated with the additional disadvantage in that in the region of the orbit of satellites there is intensive radiation with heavy atomic nuclei. Such radiation can only be reduced with great technical expenditure by respective hardening of the highly-integrated electronic components. However, there still remains a residual irradiation which acts on the electronic components, said radiation having a negative effect on the service life of said electronic components.

SUMMARY OF THE INVENTION

It is thus the object of the invention to provide a device and a method for determining the attitude of communications satellites which device and method meet the requirements for operational accuracy of attitude determination, and which can be realised with a minimum of technical expenditure, in particular by obviating the need for at least one precise sensor.

This object is met by the characteristics of the independent claims. Alternative embodiments are provided in the subordinate claims.

By using optical data transmission systems for determining the attitude of the satellites, said optical data transmission being necessary anyway for the operation of communications satellites, the device and the method of the invention require relatively little technical expenditure because the data required is already available on board the satellite and can be processed using relatively simple methods.

BRIEF DESCRIPTION OF THE FIGURES OF THE DRAWINGS

Below, the task is described by means of the enclosed figures. as follows.

DETAILED DESCRIPTION

Figure 1:
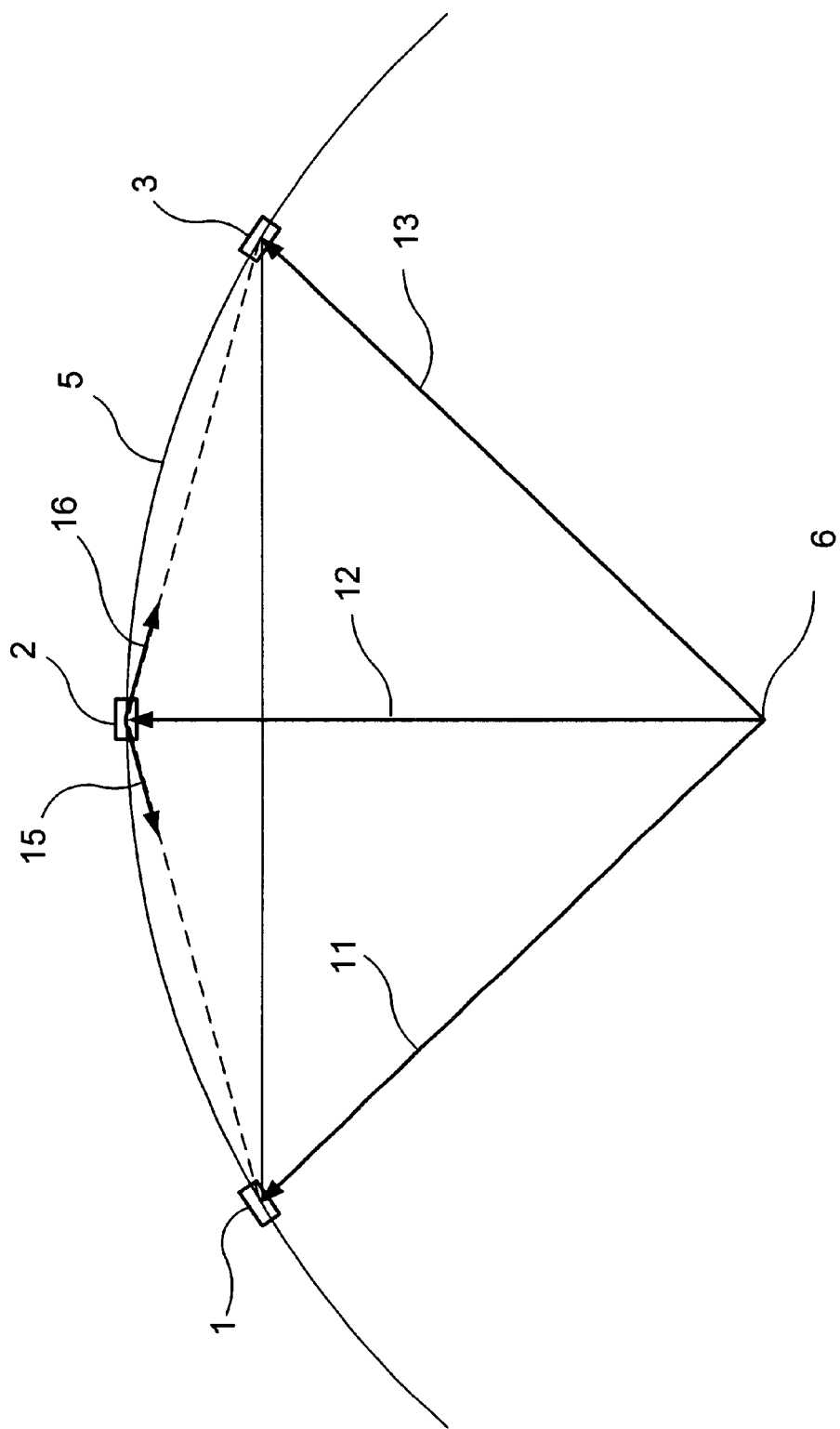
FIG. 1 shows a constellation of three satellites on the same orbit, said satellites exchanging data among themselves for attitude determination according to the invention.

FIG. 1 shows three satellites 1, 2, 3. The attitude determination system is described starting with the satellite 2 which is located in the area between satellites 1 and 3. The satellites 1, 2, 3 are in an orbit 5 around the earth, with the centre of the earth diagrammatically indicated by reference number 6.

Each satellite 1, 2, 3 is able to exchange information with any of the other satellites in the constellation shown. Preferably, this information exchange takes place via optical data connections by means of laser technology. Each satellite 1, 2, 3 is able to determine its attitude relative to the centre 6 of the earth, for example its attitude in an inertial geocentric co-ordinate system whose source point is situated in the centre 6 of the earth. By way of the optical data connections, each satellite 1, 2, 3 is able to transmit its own attitude to other satellites. Conversely, there is the option that each satellite 2 receives the attitude data of the other satellites 1, 3 which are involved in the data exchange. For example, satellite 2 is able to transmit its own attitude, in FIG. 1 indicated by vector 12, to the other satellites 1 and 3. Furthermore, by way of the optical data connections which exist between satellites 1 and 2 or 2 and 3 respectively, satellite 2 receives the attitude data of satellite 1, said data being indicated by vector 11, as well as attitude data of satellite 3, indicated by attitude vector 13.

Preferably, altitude determination takes place by means of the Global Positioning System (GPS). For this purpose, each satellite 1, 2, 3 has a respective GPS receiver (not shown) and an associated data processing device for determining the attitude from sensor data on board. However, determination of a satellite's own attitude can also be undertaken using other methods, e.g. using the estimation method by means of orbit propagation.

Since the satellite 2 knows the attitude vectors 11, 12, 13, it is able to determine the directional vectors to the satellites which are involved in the optical data connections, i.e. satellites 1, 3. This takes place on the basis of known mathematical operations which are carried out by respective data processing devices provided in satellite 2. In particular, satellite 2, using attitude vectors 11, 12 or 12, 13 respectively, calculates the directional vector 15 which is directed from satellite 2 to satellite 1, and calculates the directional vector 16 which is directed from satellite 2 to satellite 3, with the directional vectors 15, 16 preferably being determined in the inertial geocentric co-ordinate system.

The attitude data of the transmitting satellite are preferably transmitted via the optical data connection together with the useful data.

To establish optical data connections, each of the satellites which is involved in data exchange, comprises at least one optical system 21 with which the laser beams transmitted by the other satellites involved in the data exchange, can be received and with which optical system 21, laser beams can be transmitted to the other satellites which are involved. The optical system comprises in particular at least one movable telescope and several movable mirrors as well as fixed optical elements. By means of the optical system 21, the transmitted or received laser beam is subjected to optical imaging (FIG. 2) with the optical image being acquired or measured by means of an optical tracking sensor 22. The optical sensor 22 acquires in particular the deviation 24 of the received laser beam, from a reference point on the imaging plane of the optical system. By means of the optical system, which can be adjusted in a predetermined way, the received laser beam can be moved to the reference point or at least to a defined region of the reference point. On the basis of the measured deviation 24, or on the basis of any deviation 24 still present after adjustment of the movable parts of the optical system, together with the adjustment angle 25 at the time, of the movable components of the optical system, by means of known methods a directional unit vector from the receiving satellite 2 to the respective transmitting satellite 1 or 3, can be determined. Preferably, this unit vector is first determined in the co-ordinate system of the optical system and then by means of usual mathematical transformations in the fixed-body co-ordinate system of satellite 2. Attitude determination then takes place on the basis of known mathematical methods, not only based on the directional unit vectors 15 or 16 determined in the inertial geocentric co-ordinate system, but also based on the directional unit vectors in the fixed-body satellite co-ordinate system 2, said directional unit vectors having been determined from the measured deviations 24 and from the adjustment angles 25 at the time.

Figure 2:
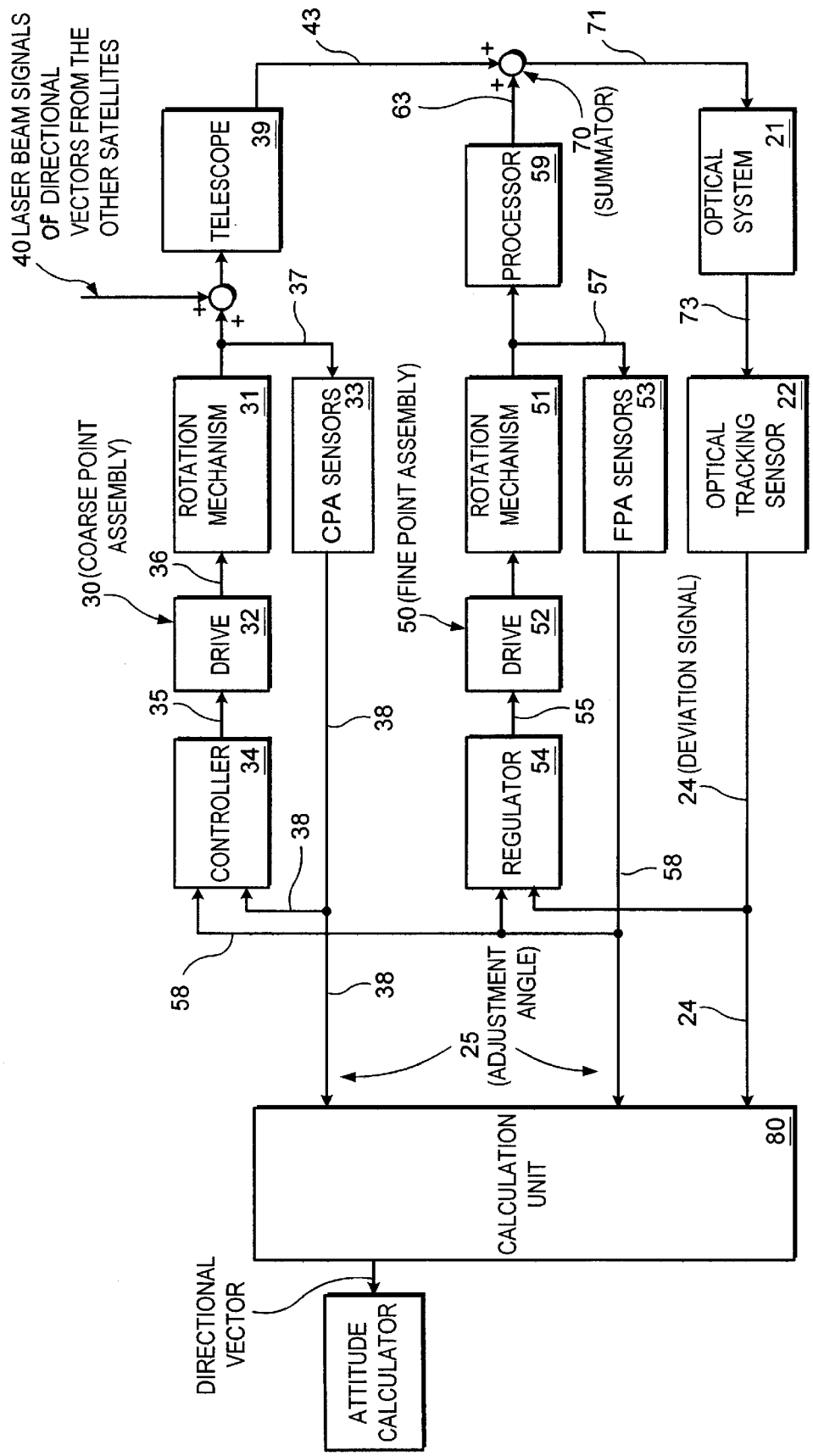
FIG. 2 is a block diagram of the functions necessary for setting and controlling an axis of the optical system, said functions being used to set and receive a laser beam from another satellite, said laser beam being intended for the exchange of useful data. From these data, the measured variables are determined which, apart from the attitude data of the satellites involved, are required as input quantities by the attitude determination system according to the invention.

Below, by means of FIG. 2, the determination of the directional unit vectors is described, which determination takes place in a fixed-body co-ordinate system of the satellite, said directional unit vectors being formed from the deviation 24 and the adjustment angle 25 at the time. For the sake of clarity, FIG. 2 shows the functional context of the mechanisms associated with the determination of these variables, only in one axis. The representation in FIG. 2 analogously applies to three axes.

The optical system 21 by which imaging of a received laser beam takes place, can be adjusted by means of a coarse pointing assembly (CPA) 30 and a fine pointing assembly (FPA) 50. From the point of view of device technology, preferably the telescope of the optical system 21 is held on the CPA, while the movable mirrors are preferably located within the CPA and held on the FPA. The fine pointing assembly (FPA) 50 is thus situated functionally downstream of the coarse pointing assembly (CPA) 30. Usually the coarse pointing mechanism 30 comprises a two-axis rotation mechanism 31 with which the azimuth angles and elevation angles of the telescope can be set; drive electronics 32 for the two-axis rotation mechanism 31; and CPA sensors 33 for measuring the azimuth angle and elevation angle at the time, of the rotation mechanism 31. A respective CPA controller 34 is arranged functionally upstream of the drive electronics 32, said CPA controller determining desired signals 35 for the CPA drive electronics 32. The CPA drive electronics 32 in turn issues respective corrective signals 36 to the two-axis CPA rotation mechanism 31. The CPA sensor 33 which can comprise a group of sensors, determines the measured rotation angle 38 from the respective actual rotation angle 37 of the CPA rotation mechanism 31. By way of an actual rotation angle 37 of the telescope, a received laser beam 40 is subjected to a change in angle, with the size of the change depending on the rotation angles and the optical imaging characteristics of the telescope 39. This results in an angle of incidence 43 of the laser beam 40.

The fine pointing assembly 50 also comprises a two-axis rotation mechanism 51; FPA drive electronics 52 arranged upstream; and an FPA regulator 54 arranged upstream of said FPA drive electronics 52. The FPA regulator 54 transmits a desired FPA signal 55 to the FPA drive electronics 52 which sends an FPA corrective signal 56 to the FPA rotation mechanism 51. The actual rotation angle 57 measured at the time, of the FPA rotation mechanism 51, is measured by an FPA sensor 53 or an FPA sensor system 53. The measured rotation angle or rotation angles 58 are available for further signal processing or data processing in processor 59. The settings of the movable mirrors, said settings being carried out by the fine pointing assembly 50, result in optical imaging 59 and thus a change in angle 63 which is smaller than the change of angle 43.

By way of the summation location 70, FIG. 2 shows that the change in angle of incidence 43 due to the coarse pointing assembly 30 and the change in angle of incidence 63 due to the fine pointing assembly 50, add up. Due to this change in angle 43, 63, an optical angle 71 results which is imaged by optical imaging by means of the optical system 21. Optical imaging by means of the optical system 21 results in an actual deviation 73 from the reference point of the imaging plane of the optical image of the optical system 21. As has already been described, the optical sensor 22 determines a measured deviation 24 accordingly.

The deviation 24 measured by the optical sensor 22 is fed to the FPA regulator 54. Furthermore, the rotation angle 58 measured by the FPA sensor 53 is fed to the FPA regulator 54. The measured rotation angle 58 also continues to be fed to the CPA regulator 34. Based on the rotation angle 38 measured by the CPA sensor 33 and the rotation angle 58 measured by the FPA sensor 53, the CPA regulator 34 is able at any time, to determine the desired signal 35 for the CPA drive electronics 32. Analogously, from the measured rotation angle 58 and the measured deviation 24, the FPA regulator 54 is able to determine the desired FPA signal 55.

The adjustment angles 25 at the time, i.e. the measured rotation angles 38, 58 and the measured deviation 24 are fed to a calculation unit 80. In this calculation unit 80 these currently received input data 24, 25 are converted in the fixed-body co-ordinate system of the receiving satellites 2, to become the directional vector which is directed from the receiving satellite 2 to one of the neighbouring satellites 1, 3 or to another satellite involved in data exchange.

The representation of FIG. 2 only refers to one adjustment axis respectively, of the coarse pointing assembly 30 and the fine pointing assembly 50. Preferably however, adjustment of both the coarse pointing assembly 30 and the fine pointing assembly 50 takes place in two axes. With each change in attitude of the satellite 2, i.e. with each rotation of the satellite on one or several spatial axes, by means of the adjustment angles 25, the laser beam 40 to be received for establishing an optical data connection to other satellites, is held in all four adjustment axes in a reference point of the imaging plane via the optical system 21. Expansion of the representation shown in FIG. 2 referring only to one axis, to all spatial axes and the four adjustment axes, takes place according to known control-technological and mathematical considerations.

Thus in relation to two satellites which are exchanging data, e.g. in relation to satellites 2 and 1, emanating from satellite 2, two vectors are available for determining the attitude of satellite 2: firstly the directional vector 15 in the inertial geocentric co-ordinate system which vector is arrived at from determining the attitude and the mutual transmission of the attitude data, and secondly the vector directed from the receiving satellite 2 onto the other satellites exchanging data with said receiving satellite 2, e.g. satellite 1 in the fixed-body co-ordinate system of the receiving satellite 2 which has been determined in the calculation unit 80.

Attitude determination according to the invention requires these two vectors in relation to at least two satellites 1, 3 which are exchanging data with the receiving satellite 2. Preferably this data exchange is achieved by means of optical data connections, but it can also take place in any other way. The data exchange necessary for attitude determination is preferably carried out as part of the exchange of useful data which has to be carried out anyway. Consequently, the attitude determination method according to the invention results in only very slight additional technical expenditure. At least two satellites 1, 3 which together with their laser beams and the attitude information, transmitted via said laser beams, for determining the attitude of satellite 2, are preferably on the same orbit as the receiving satellite 2. They can however also be situated on different orbits; this is of no consequence for the method according to the invention. Preferably such neighbouring satellites are selected whose angle to satellite 2 between the directional vectors 15, 16 is as large as possible. Preferably more than two transmitting satellites which are partly on different orbits, are used to determine the attitude of the satellite 2 which is receiving at the time. The more satellites 1, 3, transmitting at the time, that are available, the more the accuracy of the method can be improved. The satellites 1, 3 transmitting at the time can at other times or simultaneously be receiving satellites so as to determine their own attitude from the data received.

From the minimum of four directional vectors, i.e. two directional vectors in the inertial geocentric co-ordinate system and two directional vectors in the fixed-body co-ordinate system of the satellite, the satellite determines its attitude with the use of known mathematical methods. Preferably, calculation of the attitude of the satellite 2 which is receiving at the time, is carried out according to the following method: from the two directional vectors 15, 16 an orthogonal 3 by 3 matrix is formed by means of two intersection products. This is carried out in the same way for the two sets of directional vectors which are given in the inertial geocentric co-ordinate system and in the fixed-body co-ordinate system of the satellite. Two matrices are thus obtained which describe the same attitude in the two co-ordinate systems. By multiplying the matrix formed from the directional vectors in the inertial co-ordinate system by the resolvent of the matrix formed from the directional vectors in the fixed-body co-ordinate system of satellite 2, the required attitude matrix of satellite 2 results.

In the case where the satellite 2 which is receiving at the time, is communicating with its neighbouring satellites 1, 3, calculation of the attitude is unequivocal, provided the three satellites 1, 2, 3 are not attitudeed in a straight line, a configuration which can be excluded for satellites in a constellation with the same orbit or orbit altitude.

If more than two neighbouring satellites are available, calculation of the attitude of the satellite is overdetermined. In this case the accuracy of attitude determination can be improved, due to the additional measurement information, by using calculation methods for overdetermined equation methods, in particular least-squares methods or minimum-variance estimates. Furthermore, dynamic estimation methods, e.g. based on sequential processing of the measured data, in particular by means of Kalmann filters, can also be used.

The measuring errors of the sensors contain high-frequency fractions, e.g. a frequency above 20 Hz, which are for example caused by noise or interference emanating from the stabilising flywheels used for stabilising the satellites. Determining the attitude of the satellite requires attitude readouts at a significantly lower frequency. High-frequency fractions in the attitude readout can therefore be filtered out by a respective filter, in particular a low-pass filter or a Kalmann filter. This will improve the attitude readouts. Furthermore, mechanical attenuation measures and/or further precautions such as notch filters or an active control system, can be provided.

Pointing errors during integration of the satellites as well as thermal deformation cause static errors or errors which change only slowly, in the pointing of the payload. Pointing of the payload can be improved in that a relative attitude measuring sensor is fitted between the optical communication terminals and the payload (e.g. the antennae). The measured relative attitude is then used to correct pointing of the payload accordingly.

Thus, the method according to the invention comprises the steps: calculation of two vectors in the inertial geocentric co-ordinate system in the direction of at least two neighbouring satellites, based on measuring the attitudes, for example by GPS and transmission of the attitude data by means of the already existing optical data exchange; calculation of two vectors in the fixed-body co-ordinate system of the receiving satellites (said vectors corresponding to the direction of the incoming laser beam from the satellites exchanging data with the receiving satellites, e.g. the two neighbouring satellites) based on the sensor information of the optical system, i.e. the angle attitude of the coarse pointing assembly 30, the angle attitude of the fine pointing assembly 50, the measured deviation 24 of the optical sensor 22; calculation of the satellite attitude from at least two sets of two directional unit vectors each, which have been determined in the inertial geocentric co-ordinate system and in the fixed-body co-ordinate system of the satellite; filtering of the high-frequency fractions of the measured value disturbances; and if necessary improvement in the determination of the payload attitude by relative attitude measuring between the payload and the optical communication terminal.

What is claimed is:

1. A device for determining the attitude on board a first satellite comprising:

a data transfer device for carrying out optical data exchange between said first satellite and at least two other satellites;

a device for determining attitude of said first satellite;

a device for determining directional vectors in an inertial co-ordinate system based on the attitude of said first satellite and on directional vectors from said at least two other satellites, said directional vectors being adapted for transmission by the data transfer device between said first satellite and said at least two other satellites;

a device for determining a respective directional vector directed to said at least two other satellites, in a body-fixed co-ordinate system of said first satellite; and said device for determining in said first satellite a respective directional vector from said at least two other satellites including means for receiving laser beam signals of said directional vectors from said at least two other satellites, a coarse pointing assembly and a fine pointing assembly, said coarse pointing assembly and said fine pointing assembly being connected to correct any deviation of said laser beam signals of said directional vectors with respect to a reference.

2. The device of claim 1, wherein the device for determining said respective directional vector in the body-fixed co-ordinate system of the first satellite further includes:

an optical system for optical imaging of the laser beams received by said at least two other satellites, said coarse and fine pointing assemblies being connected to the optical system for adjusting the optical system in an imaging plane in the region of said reference during a change in attitude of the first satellite;

a measuring device for measuring adjustment angles of the coarse and fine pointing assembles, an optical sensor for measuring deviation of the received laser beam signals with respect to the reference in the imaging plane;

a calculation unit which receives the deviation and the adjustment angles and determines a respective directional vector in the fixed-body co-ordinate system of said first satellite with respect to said at least two other satellites engaged in optical data exchange with said first satellite.

3. The device of claim 2, wherein said coarse pointing assembly has an output representing said deviation which is combined with the laser beam signal from the respective of said at least two other satellites, said fine pointing assembly having an output which is added to the combined signal of the output of the coarse pointing system and said laser beam signal to produce a resultant signal.

4. The device of claim 3, wherein the resultant signal is connected to said optical system.

5. The device of claim 1, wherein attitude determination of the satellites takes place by means of a GPS system.

6. The device of claim 1, wherein attitude determination takes place by means of orbit propagation.

7. The device of claim 6, wherein with attitude determination by means of orbit propagation, support for measured data is additionally provided.

8. The device of claim 1, wherein the first satellite receives the laser beam signals for more than two of said other satellites involved in data exchange with said first satellite.

9. The device of claim 1, wherein for determination of the directional vectors, calculation methods for overdetermined equation systems are used.

10. The device of claim 9, wherein least-square filters are used.

11. The device of claim 1, wherein for determination of the directional vectors, sequential processing of the measured data takes place.

12. The device of claim 11, wherein Kalmann filters are used.

13. The device of claim 1, further including mechanical attenuation devices and dynamic filters are provided to reduce disturbance as a result of satellite vibration.

14. The device of claim 1, wherein a relative attitude sensor is provided between an optical communication terminal and a payload of the satellite to improve attitude information of the payload.

15. A method for determining the attitude of a first satellite, comprising the following steps:

calculating a directional vector in an inertial geocentric co-ordinate system of said first satellite in the direction of at least two other satellites involved in data exchange with said first satellite based on measuring attitudes of the satellites involved in the data exchange, and on transmitting the attitude data by means of optical communication;

calculating a directional vector in a body-fixed co-ordinate system of said first satellite which directional vector is directed from said first satellite to said at least two other satellites involved in data exchange with said first satellite, based on coarse and fine evaluation of sensor information regarding setting of an optical device receiving a laser beam signal from a respective satellite of said at least two other satellites involved in data exchange and based on deviation of said optical laser beam from a reference point in a fixed imaging plane in said body-fixed co-ordinate system; and calculating the attitude of the first satellite from at least two directional vectors in the inertial geocentric co-ordinate system and the body-fixed co-ordinate system of the first satellite.

* * * * *